(No Model.)  2 Sheets—Sheet 1.
W. E. ROBERTS.
VELOCIPEDE.
No. 461,588. Patented Oct. 20, 1891.
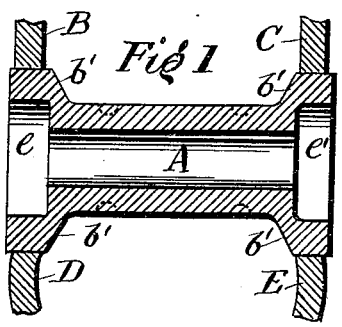
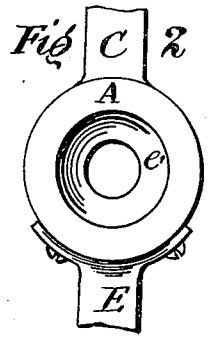
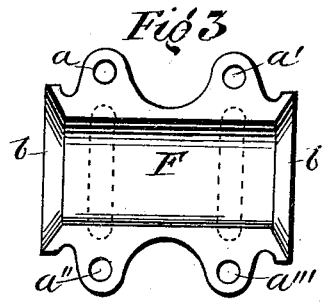
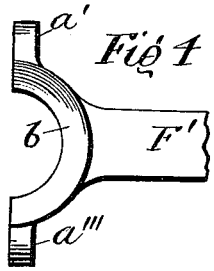
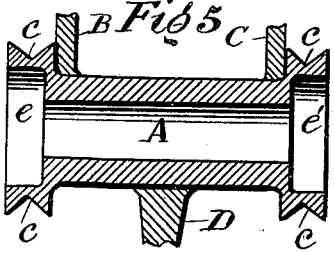
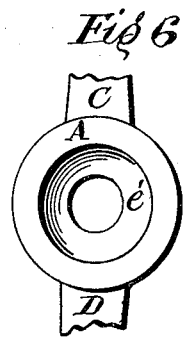
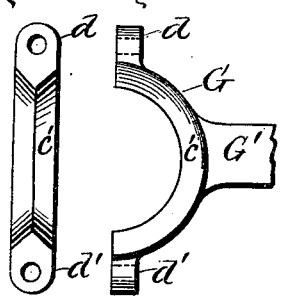
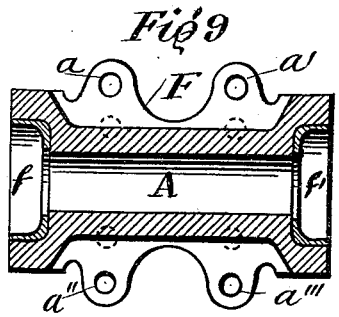
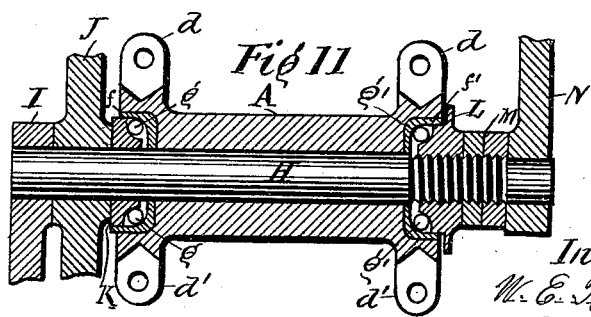
Witnesses
L. M. Low
J. N. Forbes
Inventor
W. E. Roberts
by Richards & Co.
attorneys.
THE NORRIS PETERS CO., PHOTO-LITHO., WASHINGTON, D. C.

(No Model.) 2 Sheets—Sheet 2.
W. E. ROBERTS.
VELOCIPEDE.
No. 461,588. Patented Oct. 20, 1891.
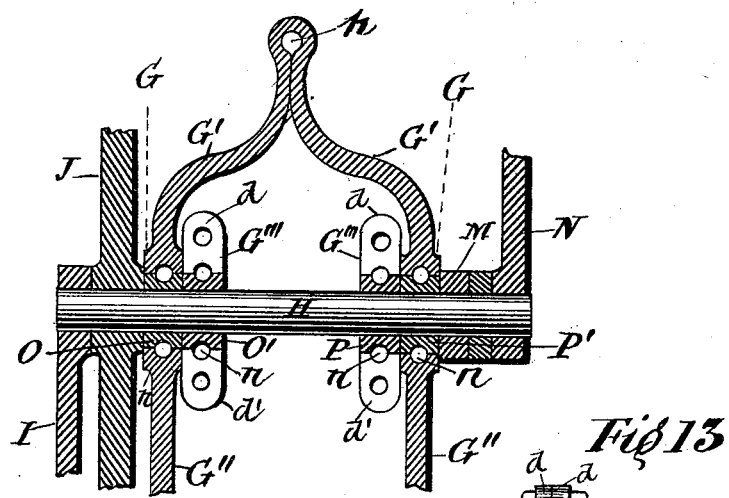
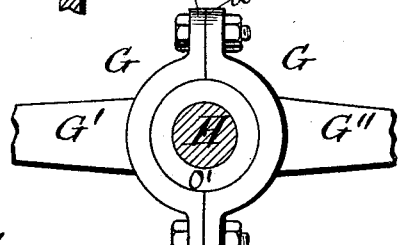
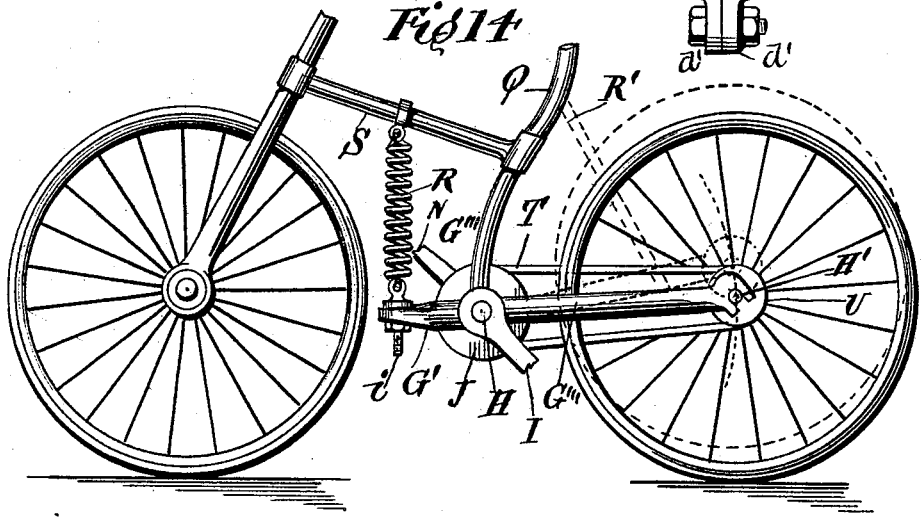
Witnesses
L. M. Low
J. N. Finch
Inventor
W. E. Roberts,
by Richards & Co.
attorneys.

UNITED STATES PATENT OFFICE.

WILLIAM EDWARD ROBERTS, OF BRISTOL, COUNTY OF GLOUCESTER, ENGLAND.

VELOCIPEDE.

SPECIFICATION forming part of Letters Patent No. 461,588, dated October 20, 1891.

Application filed January 6, 1891. Serial No. 376,917. (No model.) Patented in England November 24, 1890, No. 19,032.

*To all whom it may concern:*

Be it known that I, WILLIAM EDWARD ROBERTS, residing at St. James' Square, Bristol, in the county of Gloucester, England, a subject of Her Majesty the Queen of Great Britain, have invented new and useful Improvements in the Construction of Velocipedes and Bearings Therefor, (for which I have applied for a patent in Great Britain, No. 19,032, bearing date November 24, 1890,) of which the following is a specification.

My invention relates to improvements in construction of bicycles, tricycles, and velocipedes generally, and a novel method of compounding bearings or coupling duplex bearings therefor, the object of which is to destroy or reduce vibration or shock to the rider or riders when the machine is passing over obstructions or undulations lying within the track thereof.

My invention consists, first, in constructing a bearing or bearings in such a manner that the first or direct axle-bearing may oscillate within a fixed bearing, or the first or direct axle-bearing may be a fixed bearing and the outer bearing oscillate thereon; secondly, in arranging the radiating arm or arms from the fixed bearing in such a manner as to support or carry the seat-bearing standard or other part of the machine, while the arm or arms radiating from the oscillating bearing may carry the axle or the bearing of the axle of the driving wheel or wheels, and connected by a spring or springs to the frame of the machine, or with a supplementary arm or arms radiating from the same oscillating bearing in an opposite direction and attached to a spring or springs connected to the backbone or other part of the machine; thirdly, by arranging the bearing or bearings around or oscillating upon the crank-axle or driving-spindle (commonly known as the "bottom bracket-spindle") and transmitting the power imparted to said spindle by the driver or drivers to the hind or driving wheel or wheels by means of a chain operated by a chain-wheel upon the crank-axle I am enabled to maintain the distance between the seat of the operator or operators and the driving-spindle, and the distance between the driving-spindle and spindle of the hind or driven wheel or wheels always constant and invariable, and the manner and means by which I attain this is hereinafter fully described, and shown by the accompanying drawings, in which—

Figure 1 is a longitudinal section of a first or direct axle-bearing, showing the arms radiating therefrom broken off. Fig. 2 is an end view of Fig. 1. Fig. 3 is an internal elevation of one-half of a second bearing or casing for Fig. 1. Fig. 4 is an end view of Fig. 3 or its companion half with an arm or arms attached thereto. Fig. 5 is an alternative method of constructing the first or direct axle-bearing with V or other shaped annular grooves formed within the outer periphery of the ends thereof and with radiating arms differently placed thereon relatively to Fig. 1. Fig. 6 is an end view of Fig. 5. Fig. 7 is an internal view of one-half of a second or outer bearing or bracket formed internally to coincide with the annular grooves in Fig. 5. Fig. 8 is a side elevation of Fig. 7 or its companion half, with an arm attached thereto and radiating therefrom. Fig. 9 is a repetition of Fig. 1, showing the manner in which Fig. 3 and its companion half engages therewith. Fig. 10 is a front view of a ball-bearing cup, one of which may fit into each end of Figs. 1 and 5, and shown in position by the sectional view, Fig. 9. Fig. 11 is a sectional view of a crank-axle arranged according to my invention, illustrating the method shown by Figs. 5 and 7, although the methods shown by Figs. 1 and 3 would be connected to the crank-axle in a precisely similar manner. Fig. 12 is an alternative method of constructing and arranging the bearings upon the driving-spindle to be hereinafter more fully explained. Fig. 13 is a small view showing the manner of coupling Fig. 3 and its companion half or Fig. 7 and its companion half and illustrative of the adaption of the type of bearing Fig. 7 to the method shown by Fig. 12. Fig. 14 is a side elevational view of a part of a "Safety" bicycle constructed according to my invention.

Similar letters of reference are used to indicate corresponding parts throughout the drawings.

I wish it understood that I may construct the bearings hereinafter described with an arm or arms radiating therefrom in any direction and used singly or in pairs, coupled in any desirable manner, so as to be connected to or form in themselves rods or forks or pairs of rods or forks, carrying upon their ends other bearings or a spring or springs and made of any suitable metal or combination or alloy of metals, cast or otherwise, and parts that are spoken of as attached to each other may be so attached in any practicable manner that I may vary the combination of the several parts relatively to each other to serve the same purpose and to attain the same ends without departing from the principle of my invention.

In carrying my invention into effect I construct a first or primary spindle-bearing A in the form shown by the sectional view, Fig. 1, Sheet 1, and attach thereto so as to radiate therefrom arms or projections B C D or B, C, D, and E, as may be desired, and attach them to or form them into rods, forks, or yokes constituting parts of the bicycle, tricycle, or other velocipede. Upon the outside of A, I provide a second bearing or casing F, made in two pieces or halves, one of which is shown in elevation by Fig. 3, Sheet 1, and by the side view, Fig. 4, Sheet 1. These are bolted together by the lugs $a$ $a'$ $a''$ $a'''$ face to face. The ends of F are beveled internally at $b$ to coincide with and fit within or upon a similar bevel $b'$ found upon A. Upon either or both of the pieces F is or are a radiating arm or arms F', as shown at Fig. 4, Sheet 1. It will be understood when A and F are fitted together in the manner described that if the arms of A be held in a fixed position F, its arm or arms may oscillate upon A, or if the arms of F be so held A and its arm or arms may oscillate within F, and so one may become a rocking-lever within or upon the other; or I may construct A in the manner shown by Figs. 5 and 6, Sheet 1, with radial arms B, C, or D, or B, C, and D similar to Fig. 1, but placed upon A in a different position. Upon the outer periphery of each end of A, I provide a V or other shaped annular groove $c$ and construct bearings or brackets G to fit therein. These like F are made in two pieces, one of which is shown in front and side elevation by Figs. 7 and 8, Sheet 1. G is formed internally at $c'$ to coincide with $c$ in A, and is provided with lugs and bolt-holes $d$ and $d'$, so that these may be bolted together surrounding A and within $c$, one pair at each end of A. The half-brackets G may be either or both provided with an arm G', which may radiate therefrom in such a manner that one arm from the coupled pair G upon one end of A may be joined to one arm from the coupled pair at the opposite end of A and so form one arm, which may be joined to or form the seat-standard of the machine or form a fork or ring, as shown at Fig. 12. The oscillating relation of A and G will be similar to that of A and F, previously described; or I may construct A and G so as to interpose balls as bearings between them, and to attain this the annular groove $c$ will be semicircular instead of V-shaped, and a similar groove will be formed within G in place of the V-shaped projection $c'$.

Whichever of the before-mentioned methods of constructing A externally I may adopt internally they are the same and are provided with recesses $e$ and $e'$, one at each end, into each of which I force a bottomless cup, Fig. 10, Sheet 1, and shown in position by $f$ and $f'$, Fig. 9, Sheet 1.

In describing the manner in which I connect the said bearings to the driving-spindle I have chosen in Fig. 11 to illustrate the application of those shown by Fig. 5, Sheet 1. Upon one end of the crank-shaft or axle H, I attach the crank I and chain-wheel J abutting against J. I also fix upon H a circular metallic disk K, provided with an annular groove. The diameter of K is such that when A is slid upon H, K fits freely within the mouth of the cup $f$, so that a suitable number of balls $g$ may be interposed between the groove in K and the interior of the cup $f$. The opposite end of H is provided with a screw-thread and upon this I screw a disk L similar to K and interpose between L and $f'$ a like number of balls $g'$, these like $g$ being of course to reduce friction. When L is screwed home sufficiently to permit A to revolve freely upon H suitable lock-nuts M may be used previous to fixing the other crank N. I claim neither K, L, $f$, $f'$, or M as forming any part of the novelty of my invention, but simply show them as the manner of mounting the bearing A adopted by me. The arms B C upon A may be connected to rods or form in themselves rods for carrying the spindle or the bearings of the spindle of the back or driving wheel or wheels of the machine, and the arm D may be attached to a spring connected to the backbone of the machine, so that B, C, and D may form a rocking lever upon H in a similar manner to G' and G'', Fig. 14, while the arm upon one of the halves of each of the brackets G in Fig. 11, Sheet 1, may be connected together for the purpose of forming supports for the bearing of the seat or seats of the driver or drivers; or B C may be used as the seat-standard and D dispensed with, or D may be used and B C dispensed with. In either of the latter cases the halves of G will each carry an arm and be formed into a rocking lever similar to B C D, just described. In the latter method G will oscillate upon A on H, and in the former B C D will oscillate within G; or I may as an alternative method arrange my bearings in the manner shown by Fig. 12, Sheet 2. In this case I dispense with the primary bearings, Figs. 1, 2, 5, and 6, and in lieu thereof I employ four broad metallic rings O, O', P, and P' upon the outer face of each of which, centrally, I form an annular groove and fix said rings upon the shaft or spindle H, preferably in the position shown by Fig.

12, Sheet 2. The brackets G in this method would be provided with internal grooves, as previously mentioned. In place of the V-shaped projection $c'$ I employ eight of the half-brackets, Fig. 7, Sheet 1, so that when bolted together in the manner previously described four complete brackets are formed, as in Fig. 13. These when so coupled are placed one surrounding each of the fixed rings O, O', P, and P', so that the grooves in the brackets coincide with the grooves in the rings, and in these circular grooves I place a suitable number of balls $u$ to reduce friction; or I may form a V-shaped groove in each of O, O', P, and P', and leave the projection $c'$ on each of the brackets to engage therewith. The coupled brackets G, forming the outside bearings, have each two arms, as shown by Fig. 13, and marked G' and G'' in Fig. 14. The inside brackets have each one arm only, and these I use to form the seat-bearing standard and have lettered them and their arms G'''.

In the view Fig. 12, Sheet 2, the brackets G and their arms G' and G'' are shown in section and describe a section taken upon an imaginary horizontal line through the center of the smaller view Fig. 13. The brackets G''' are not in section, but simply divided and present the inner face of one half similar to Fig. 7, Sheet 1; or I may dispense with the rings O, O', P, and P' and form annular grooves in H in lieu thereof and cause G and G''' to engage therewith in a similar manner; or I may form internal grooves in each of the bearings F, Fig. 3, Sheet 1, as shown by the dotted lines thereon, and place the rings O' and P upon H in such a manner that F may engage therewith in a similar manner to G''' and for a like purpose; or F may be arranged to fit direct upon H and the grooves in H and F made to coincide, and conical projections may be formed upon O and P' similar to $b'$ upon A, Fig. 1, Sheet 1, so that the bevel $b$ upon F may engage therewith.

I may here mention that I may form annular grooves upon the exterior of A, Fig. 1, Sheet 1, as shown by the dotted lines thereon, so as to interpose balls as bearings when the system is adopted wherein A and F are employed together. This is shown by the dotted circles in Fig. 9, Sheet 1.

I have previously mentioned in the preamble hereof that my invention relates to the construction of velocipedes generally.

In Fig. 14, Sheet 2, I have elected to illustrate the manner in which I construct a Safety bicycle, adopting therein the method shown by Fig. 12, Sheet 2. The arms G' are curved and joined so as to become as one arm, embracing both brackets, and constructed so as to form a ring $h$ in the end thereof. The arms upon G''' are formed so as to become part of or be connected to the seat-bearing standard Q. The arms G' upon the other pair of brackets are connected by the ring $h$ to one end of a spiral spring R, connected to the backbone S or other similar part of the machine. A screw $i$, projecting from the bottom of R, passes through $h$ and is held in that position by a nut screwed thereon, the adjustment of which serves to regulate the tension of R, according to the weight of the operator. The arms G'' may be constructed so as to form a fork, or be constructed to a fork carrying the spindle H' of the rear or driving wheel. A chain T engages with a chain-wheel J upon the driving-spindle H and a preferably smaller wheel U upon H'. The weight of the driver when seated upon Q is practically borne by the tension of R, the elasticity of which permits me to dispense with a spring beneath the seat of the driver, as hitherto adopted in similar machines. I am enabled by this means to maintain the distance between the driver and the crank-axle or driving-spindle H, and consequently between the driver and the pedals, always constant and invariable. The back or driving wheel bearing-arm G'' and the arm G', connected to R, form a rocking lever fulcrumed upon and oscillating about the one and the same center—*i. e.*, the axis of H—so that the driving-wheel is free to rise or ride over obstructions or undulations within its path without imparting shock or vibration to the rider. The motion of H' when obstructions are encountered by the driving-wheels describes the arc of a circle about the axis of H, as shown by the dotted lines through H', yet still maintains a constant and invariable distance between H and H' and H and the seat of the driver. The position of the driving-wheel and rocking-lever G' and G'' under such circumstances is shown by the dotted outline thereof. I may in certain cases supplement or dispense with the spring R by the application of a second spring in or about the position shown by the dotted lines R', Fig. 14, which may, when used with R, be constructed to act in unison therewith—that is to say, R would exercise its tension against expansion, while R' would act against compression—and to attain this I may construct R' telescopically and with an internal spring or springs or arranged so as to form a cushion by the compression of the air contained therein. The steering-fork may be arranged to carry the steering-wheel within a rocking forked lever similar to G' and G''; but this not being novel forms no part of my invention.

In applying my invention to the construction of tricycles and quadricycles, I arrange the axle of the back or driving wheels to revolve within suitable bearings selected from the types described and connect the arm or arms G'' radiating from the bearings upon the bottom bracket or driving-spindle thereto or to an arm or arms upon said driving-wheel's bearing; or G'' may carry the spindle of said driving-wheels direct, as may be desired.

I am aware that rocking shafts or levers and springs have hitherto been adopted in the construction of similar machines; but these have always been to the best of my knowledge and belief arranged in such a manner that the fulcrum of said rocking lever has been that of a stationary spindle, which does not revolve or transmit power and applied to the steering wheel or wheels only and also in the oscillation of an upright seat-tube, in such cases the spindle being that of the driven wheel which does not transmit power; but I am not aware that a rocking lever fulcrumed upon or from the axis of the drawing or crank spindle and maintaining a constant and unvarying distance between the drivers and the crank-axle and between the crank-axle and the axle of the driving wheel or wheels has ever hitherto been adopted. My invention therefore consists of the method and means herein described and shown of compounding or employing bearings whereby I am enabled to hinge the body or frame of the machine to the driving wheel or wheels thereof from or at the same center or axis as that of the driving-spindle, the oscillation of said driving wheel or wheels being controlled and aided by the tension of a spring or springs in overcoming or surmounting obstructions or undulations without imparting vibration to the driver or drivers or impeding the propulsion of the machine.

What I claim, and desire to secure by Letters Patent, is—

In the construction of velocipedes and bearings or brackets therefor, a bearing A, with arms B, C, and D, having grooves $c$, the divided bearings or bracket G, formed at C' to coincide with $c$, with radiating arms G' G'', substantially as and for the purpose described.

In witness whereof I have hereunto set my hand in presence of two witnesses.

WILLIAM EDWARD ROBERTS.

Witnesses:
WALTER JAMES NICHOLAS,
ARTHUR OWEN PAMPHLETT.